United States Patent Office 3,429,226
Patented Feb. 25, 1969

3,429,226
CONTROL APPARATUS
Robert F. Rasmussen, Brooklyn Center, Minn., assignor to Honeywell Inc., Minneapolis, Minn., a corporation of Delaware
Filed Oct. 23, 1965, Ser. No. 503,386
U.S. Cl. 91—6   18 Claims
Int. Cl. F01b 25/04; F15b 13/044, 9/10

ABSTRACT OF THE DISCLOSURE

A three channel redundant system includes a power section for positioning attitude control means of an aircraft. The three channels include monitoring provisions that can absorb a concurrent failure in two channels, but provides that the third channel will be operational on the power section, to improve reliability of the system.

---

Monitoring of the three channels is obtained even during conventional operation when each channel would respond to a conventional control signal, by applying a tracer signal also to all of the channels and comparing the response of the channels to such tracer signal. A selection of the channel to control the power section is made by the monitor which selects the channel that has the best response to the tracer signal, of the three channels.

In recent years the role of the automatic flight control system for an aircraft has changed. Originally the automatic flight control system was considered an accessory item, but it has reached the point in aircraft operations where success of the intended mission of the aircraft depends upon the automatic pilot's satisfactory operation. This growing dependence on the automatic flight control system has focused greatly increased attention on its reliability. Reliability in flight control systems has been attained by redundancy, monitoring and switching methods which as applied to the flight control actuators provide various degrees of fail safe or fail operational capability. Many of the reliability provisions for flight control actuators generally tolerate but one failure. A great increase in aircraft mission reliability and efficiency could be achieved if two actuator failures could be tolerated without loss of flight control operation.

An object therefore of this invention is to provide an increase in mission reliability of an aircraft by providing dual fault corrective capability at the element level in flight control actuator components. As intended here, the term "component" is defined to be the complete actuator package that operates attitude control means of the aircraft. The primary "elements" are the servo valve, piston and feedback mechanism for a fluid type actuator.

A further object of the invention is to provide dual fault corrective capability through redundancy at the element level on flight control actuation components.

While redundancy may be simply defined as the provision of alternate means of achieving a function, a further object of this invention is to apply an indentifiable signal or tracer signal to redundant elements of a fluid actuator for monitoring the operation of such element in such manner that the individual channel containing such element could compare the element output continuously to a model.

A further object of this invention is to apply an identified signal or tracer signal for monitoring a plurality of servo valves wherein the individual channel comprising a valve could compare its output with that of other channels comprising separate valves.

The above and other objects of the invention will be evident from a consideration of the following description taken in conjunction with the subjoined drawings.

Figure 1:
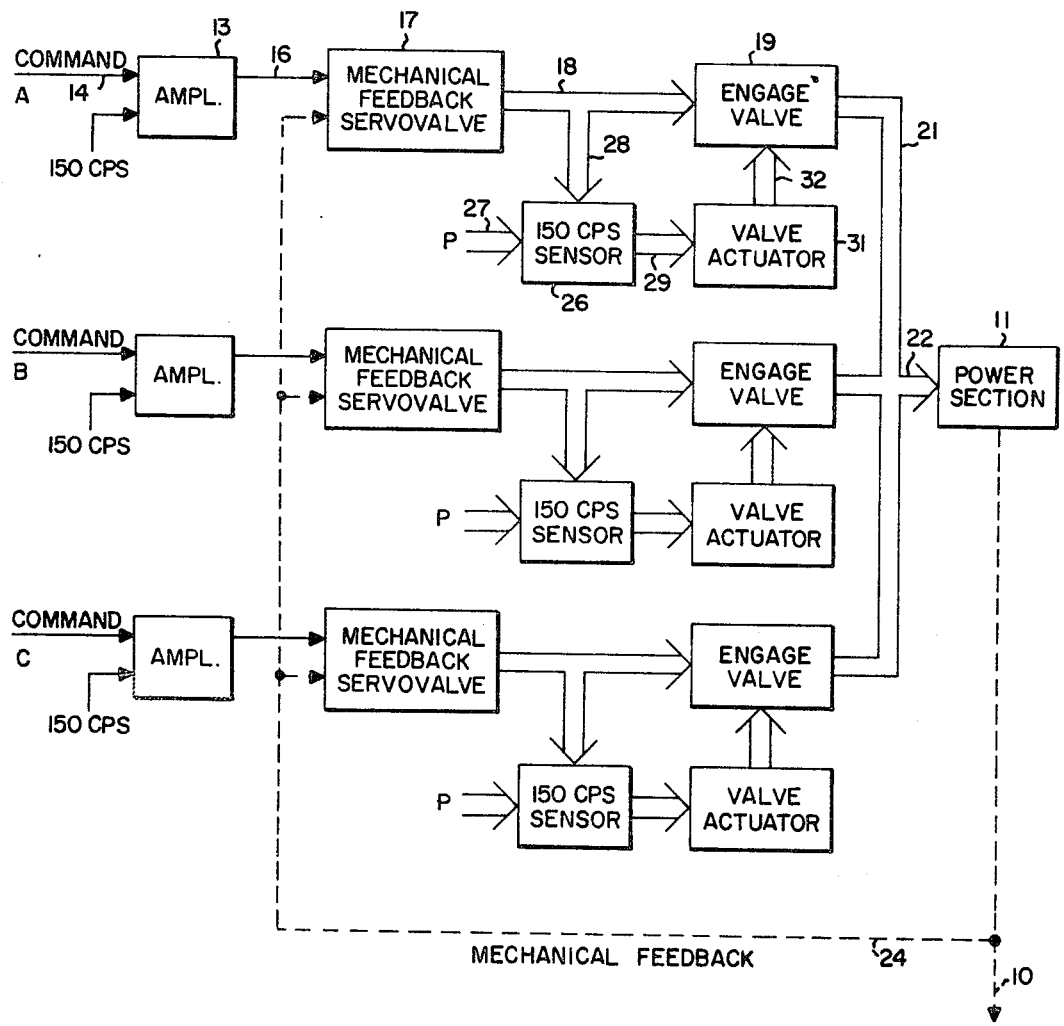
Figure 3:
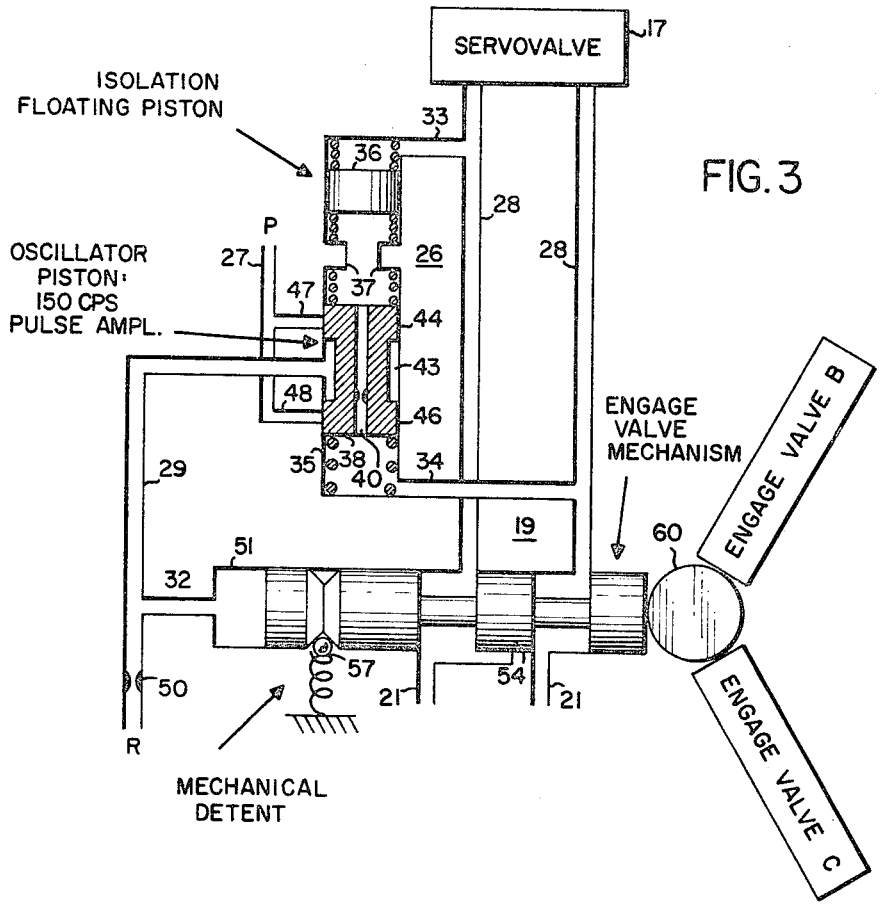
Figure 2:
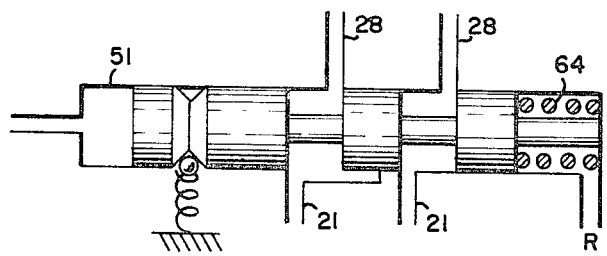
Figure 4:
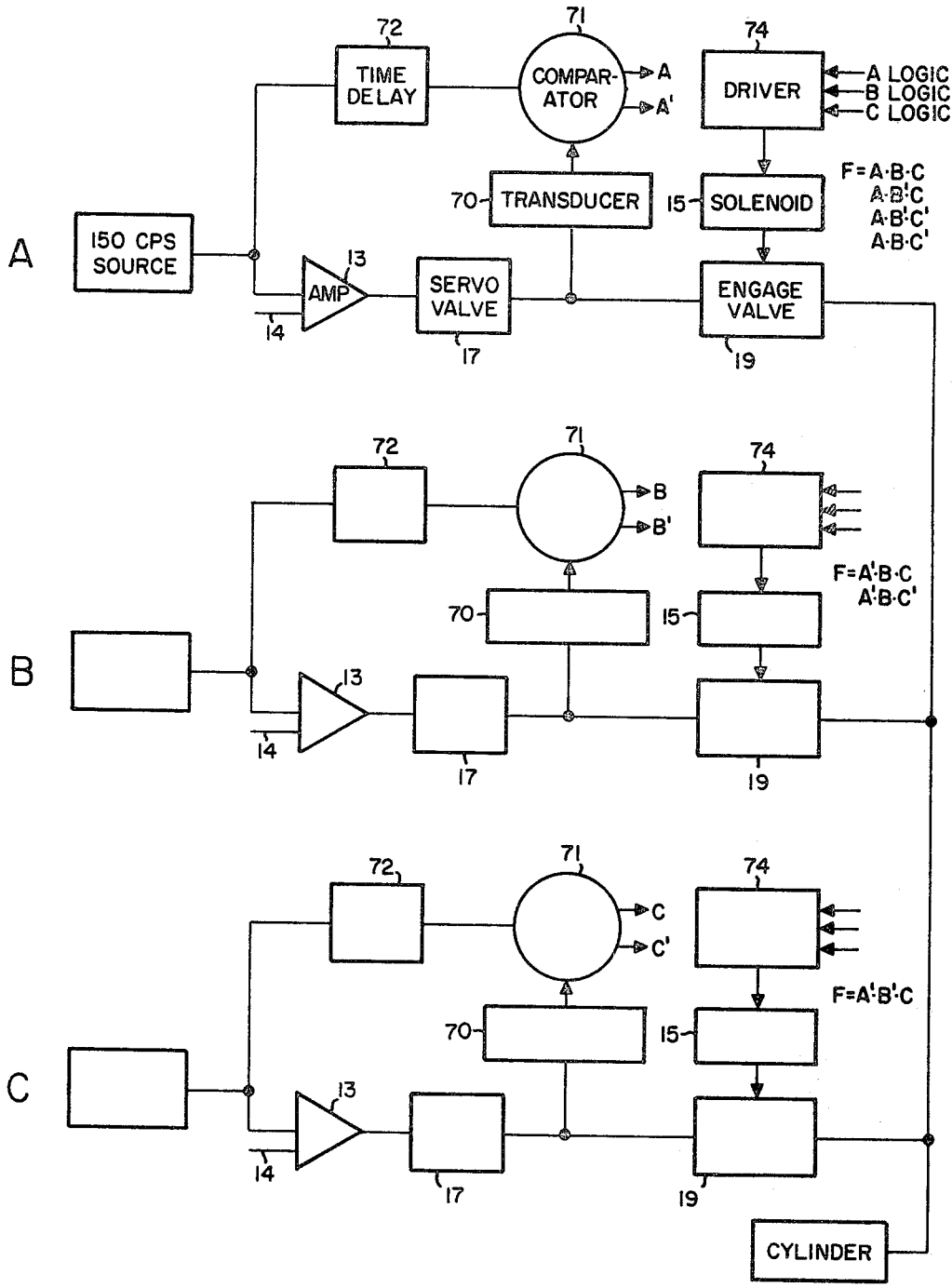

In said drawings,
FIGURE 1 shows in block form a hydromechanical implementation of a monitoring servo redundancy scheme for engage valves for three channels of a control system;
FIGURE 2 is an arrangement for monitoring the operation of a single engage valve against a model;
FIGURE 3 is a hydromechanical system implementation for monitoring three separate engage valves for a fluid motor;
FIGURE 4 is an electrical schematic implementation for a monitoring system for three servo valves.

In the monitoring method proposed herein, an identified signal or tracer signal (other than the conventional control signal) is used as a means for monitoring the operation of an element of the fluid actuator such as the servo valve. The operation of such servo valve or its output as manisfested by passage of fluid is compared in one instance with a model so that it is unnecessary to compare it with other channels. In another instance, the operation of one servo valve or its output as manifested by passage of fluid is compared with the outputs of two other servo valves in a three channel comparison gate in which only one valve of the three valves is selected for control of the fluid servo. The tracer signal may be a 150 cycle per second voltage applied to the servo valve amplifier and the operation of a servo valve is filtered out by a pressure responsive sensor that is connected to the comparison gate. While 150 c.p.s. is mentioned, any other frequencies sufficient to operate the servo valve and sensor without operating the actuator is adequate. In an alternative or electronic implementation, piezo-electric differential pressure sensors in the transfer or control valve output are combined with electronic modules for monitoring and logic circuitry to control the switching function to select one of three engage valves associated with the control valves for the servomotor.

Each of the three servo channels consists of a constant amplitude, 150 c.p.s. square-wave generator, a time delay circuit matching the transfer valve characteristic at 150 c.p.s., a comparator that makes a constant comparison between the actuator transducer output and the time delay output, and the logic circuit and solenoid valve to engage or render effective the proper servo channel with the actuator.

In the embodiments to be described, electrical connections are indicated by single continuous lines, hydraulic connections are indicated by double solid lines, and mechanical connections are indicated by single dashed lines.

Turning now to FIGURE 1 of the drawings of a hydro-mechanical embodiment of the invention, an output member 10 of a power section 11 of a fluid operated actuator may position condition control devices such as attitude or position control surfaces of an aircraft. The power section includes an operable piston (not shown) which may have fluid ported to either side thereof from a pressure source while its opposite side is conventionally connected to a fluid return. The power section piston may be controlled from any one of a plurality of channels A, B, and C. Channel A comprises an electrical signal amplifier 13 receiving command signals over conductor 14 from a source of signal such as an autopilot network. The output of amplifier 13 is transmitted by electrical conductor 16 to a mechanical-electrically operated feedback servo control valve 17. The transfer or control valve is of the type that may be both electrically and mechanically operated. The displacement of the transfer valve from a normal position by operation of amplifier 13 ports pressure fluid through an output conduit 18, a servo engage valve 19, further conduit 21 and a common conduit 22 to power section 11. There are similar components in the B and C channels so that the outputs from their respective engage valves are transmitted to the common conduit 22 and thence to the power section 11. The operation of the output member 10 results in displacement of the mechanical feedback arrangement 24 which is applied to all of the servo transfer valves to move them toward unoperated position thereby reducing the flow through its respective transfer valves.

The novelty in the redundant channel arrangement above and which will be discussed below is in monitoring provisions so that only one of the three servo valves or transfer valves, which may be variably positioned, is connected to the output cylinder or power section 11 at any time so that only that valve provides the flow for operation of the piston. To expand on the monitoring provisions for the redundant channels, a 150 c.p.s. signal is applied to each of the respective servo amplifiers from a 150 c.p.s. source. The frequency of this signal is higher than the frequency of the normal control signals applied to the command conductors of the respective amplifiers. The higher frequency signal is fed through the servo amplifier 13 into the servo valve 17 causing pulsing operation thereof. The output from the transfer valve 17 is applied to a 150 c.p.s. responsive sensor 26, to be described. The sensor 26 is connected to a pressure conduit 27 and receives a control pressure from valve 17 by conduit 28 whereby the pressure in conduit 29 is an amplification of the pressure in conduit 28. During operation of sensor 26 by operation of valve 17 an output pressure is supplied to conduit 29 and to a pressure operated valve actuator 31 which through a conduit 32 operates the normally closed engage valve 19 to open position thereby placing the conduit 18 in communication with conduit 21, 22 to power section 11, hus to engage control valve 17 with power section 11.

Continuing now to to FIGURE 3 for details of the sensor 26 which filters the 150 c.p.s. operation of the transfer valve 17, the sensor or filter comprises a cylindrically shaped chamber 35 having one end connected through a port in the cylindrical wall thereof and conduit 33 to conduit 28 extending from the servo valve 17. The opposite end of chamber 35 similarly includes a port in the cylindrical wall to which communication is made through a conduit 34 from fluid conduit 28. The sensor 26 is shown in FIGURE 3 in a cutaway view. Within casing 35 is an isolation floating piston 36 and stop members 37 secured to the internal cylindrical wall of the casing. Motion of the piston 36 is limited in one direction by the upper end of the casing 35, and its movement in the opposite direction is limited by the stop member 37 with coil springs biasing piston 36 toward a normal position. Within casing 35 below stop member 37 is a second floating piston 38 engaged on opposite sides by suitable biasing coil springs. The piston 38 has a longitudinal opening 40 there through in which there is provided a suitable fluid passing orifice. The piston 38 has an exterior annular channel 43 cut therein intermediate its ends leaving two lands 44, 46 on the exterior. When piston 38 is held in normal position by the coil springs, land 44 cuts off flow from a fluid pressure line 47 connected to the main pressure line 27. The orifice within the longitudinal opening 40 is of such size and its fluid passage property such that piston 38 will operate in response to the 150 c.p.s. operation of the transfer valve 17 but it will not respond to the normal control operation movements of valve 17. In other words the latter operation is so slow that the pressure on the opposed ends of piston 38 are readily equalized and no operating force is applied to piston 38.

Any pressure in main conduit 27 transmitted to conduit 29 by operation of the piston 38 is applied through conduit 32 and an end opening in a casing 51 of engage valve 19. The conduit 29 is also connected to the return line through a restriction or orifice 50 therein. This restriction 50 permits the build-up of pressure in casing 51 to effect movement of a spool type engage valve member 54 therein. In its operated position, shown in FIGURE 3, the engage valve member 54 places conduits 28, 28 in communication with conduits 21, 21 leading to the power section 11. In the unoperated position of valve member 54, this communication is interrupted between lines 28, 28 and 21, 21. Thus as shown in FIGURE 3 the 150 c.p.s. pulsations of the servo valve 17 alternately apply pressure to the upper end of piston 36 or to the lower end of piston 38 from conduits 28, 28. The resulting movements of piston 38 alternately places sensor output conduit 29 in communications with sensor input conduits 47 or 48 whereby pressure fluid is applied to engage valve member 54 moving it to the right in the figure. Thus the 150 c.p.s. pulsations are transmitted by floating piston 38 in pulse sensor 26 which cycles about neutral and delivers pressure pulses to engage valve member 54. The engage valve member 54 is provided with a suitable mechanical detent 57 such as a spring-loaded ball in a notch to prevent short-term cycling between channels A, B, or C or switching command to another servo valve channel until a significant difference in 150 c.p.s. tracer signal amplitude has been detected. If the servo transfer valve 17 or its amplifier 13 has a failure, the 150 c.p.s. tracer signal will not pass to the piston 38 of the sensor or pulse amplifier 26, thereby preventing the engage valve 54 from being supplied with operating pressure therefor.

The B and C redundant channels are similarly provided with sensors of the pulse ampilfier type which position similar engage valve members. As shown in FIGURE 3, the engage valve members of channels A, B and C engage the periphery of a roller 60. Such engagement is at 120° spacings on the roller periphery. The arrangement of the roller of the monitor is such that in the event that there is a failure in channel A, the engage valve members in channels B and C then overpower the engage valve member 54 of channel A through roller 60. Since the magnitude of displacement of any servo valve from its normal position by the 150 c.p.s. signal determines the pressure or quantity of fluid per instant supplied therethrough to its respective sensor, it is apparent because of the 120° spacings about roller 60 that the engage valve member with the largest 150 c.p.s. pulse pressure supplied thereto will overpower the other two engage valves and will be in control of the power section 11.

Thus by the comparison or monitoring arrangement comprising roller 60 only one of the three servo valves is connected to the output cylinder of power section 11 at any one time, and only that valve provides the flow for piston operation.

Suitable spring means may be provided to return the respective engage valve members to unoperated position when no signals are applied to the respective channel servo amplifiers.

It should be noted that upon the first failure as in channel A, the power section 11 will still be controlled. Even after a subsequent or second failure in either channel B or channel C while A is still failed one of the transfer valves such as 17 will in operated position control its pulse amplifier, so that a second failure by either channel B or channel C will leave one engage valve member in its operated position to control power section 11. Thus a dual failure-fail operative arrangement is provided so that power section 11 is still operative after two failures in two redundant channels.

In FIGURE 2 there is an arrangement for a single channel and a single power section and in which a similar pulse amplifier-sensor as in FIGURE 3 is provided. In FIGURE 2, the operation of the engage valve member 54 is opposed by a spring 64 which may be considered a so-called model against which the operation of transfer valve 17 is monitored. Improper operation of control valve 17 by the 150 c.p.s. signal will not overpower spring 64 and the control valve will not be engaged with power section 11.

Continuing to FIGURE 4, an electronic implementation of the invention and the operating means for the engage valves such as engage valve 19 is shown. The servo section is omitted in FIGURE 4 since the novelty is primarily concerned with monitoring feature independent thereof. In FIGURE 4, the servo amplifier 13 again receives command signals over conductor 14 and also 150 c.p.s. square wave signals from a suitable source. The output of the servo amplifier 13 is applied to the transfer valve or control valve 17 for porting fluid to the servomotor power section through the engage valve 19. The displacement of transfer valve 17 operates a piezo electric differential pressure sensor 70 having in turn its electrical output supplied to a comparator 71 which sums electrical input signals. The output from the 150 c.p.s. square wave source is also supplied through a time delay device 72 is an AC filter or lag device which matches the transfer valve characteristics at the applied frequency of 150 c.p.s. The comparator 71 makes a constant comparison between the signals from the output of transducer 70 and the time delay output from device 72 and normally the two outputs cancel each other. It will be noted that the A, B and C channels are similar and that each has a comparator, therein.

With respect to the outputs from the comparator, A indicates channel A is operable if the signals are equal; A' indicates channel A failure when the signals are unequal. Thus ordinarily the two signals to the comparator 71 sum to zero consequently the comparator would not have any output. In FIGURE 4, monitoring is done of the operation of the transfer valves and the servo amplifiers therefor.

As stated, comparator 71 monitors the transducer pickoff output and the time delay device 72 output. These two signals should always be identical. Therefore, summing the transducer pickoff output with the time delay output shifted 180° should give a zero resultant. A Schmitt trigger circuit, not shown, monitors the summed signals and switches when the two signals do not substantially agree. The comparator 71 reacts only to transducer signals from the 150 c.p.s. source and not from the normal control signals to the amplifier 13. The trigger output is two logic statements: one statement for an operational channel and one statement for a failed channel.

Associated with all of the comparators are logic and driver circuits such as logic and driver 74 in the A channel. The driver circuit 74, as are the others is a combined AND-OR logic and includes a suitable amplifier for providing an output to energize a solenoid 15 for operating an engage valve 19 to operative position. Solenoid operable engage valves are old in the art as in U.S. Patents 2,944,524 or 2,952,424 and such solenoid can be readily energized by a driver.

Each logic driver circuit uses outputs from all of the comparators in the plural channels A, B, C to form the elements of a conventional truth statement to energize the proper solenoid and thus operate to open position the proper engage valve.

The control logic for the respective drivers is stated adjacent thereto at the right. In the present arrangement it is desired to operate the servo section 11 in the order of priority from the A channel and thereafter secondarily from channel B upon a failure in channel A and thirdly in channel C upon a failure in both channels A and B concurrently. Consequently in the driver in channel C a simple AND logic will suffice whereas in the other two channels, A and B, a combined AND/OR logic or what might be viewed as a combination of two AND logics and an OR arrangement are needed. Channel A is in control under four conditions namely:

$$(A \cdot B \cdot C) + (A \cdot B^1 \cdot C^1) + (A \cdot B^1 \cdot C) + (A \cdot B \cdot C^1)$$

It will now be apparent that there has been provided a novel three-engage valve, single-piston actuator in a redundancy technique whereby the single-piston actuator is fail operative despite failures in two of the plural channels. Thus the foregoing has presented a novel monitoring alternatively from a plurality of channels with full operational capability of the single-piston despite failures in two channels.

While the invention has been illustrated and described in two embodiments, one hydromechanical the other electrical, it is to be expressly understood that the invention is not limited thereto but that various changes can be made in the design and the arrangement of the parts without departing from the spirit and scope of the invention as the same will now be understood by those skilled in the art.

What is claimed is:

1. In a pressure fluid operated servomotor having a power section and having a variably displaceable servo control or transfer valve for porting fluid to the servo power section thereof, in combination: an engage valve having two positions, in one of which positions operating fluid may pass through the control valve to the power section; operating means for said control valve; means applying a high frequency tracer signal and a low frequency signal to said control valve operating means; means responsive to the control valve operation from said high frequency signal for moving said engage valve to said one position; and means for moving the engage valve to the other position upon removal of the high frequency signal, said low frequency signal having a frequency low enough so that the power section does not respond thereto through the low frequency operation of the control valve.

2. In a pressure fluid operated servomotor having a variably displaceable servo control valve for porting fluid to a power section of said servomotor, in combination: an engage valve associated with said control valve and power section and having two positions, in one of which an open fluid conducting conduit is provided between the control valve and the power section; operating means for said control valve; means applying a low frequency signal and a high frequency signal to said valve operating means; means responsive to cyclic pressure fluid caused by the control valve operation resulting from the high frequency signal for moving said engage valve to said one position, said low frequency signal having a frequency low enough so that the power section does not respond thereto through the low frequency operation of the control valve.

3. In a fluid operated servomotor having a plurality of variably displaceable servo control valves for porting operating fluid to a power section thereof, in combination: an engage valve for each control valve having two positions, in one of which fluid may pass during displacement of the control valve to the power section; signal responsive operating means for said plurality of control valves; means applying an oscillating electrical signal to all said valve operating means; a plurality of sensor means corresponding to the plurality of control valves and responsive to its respective control valve operation tending to move its respective engage valve to said one position; and means responsive to all engage valves for biasing an engage valve to the other position, whereby only one of the three servo control valves is connected to the power section at any one time.

4. In a fluid operated servomotor having a power section and having a plurality of control valves for porting fluid to a servo power section, each control valve having an engage valve operable to one position to render a control valve effective on said power section, and a plurality of operating means for said control valves; in combination: means applying an oscillating signal to all of said operating means; a plurality of sensor means operating said engage valves and responsive to said plurality of control valves; and comparing means controlled by all engage valves and permitting but one of said engage valves to be moved to said one position.

5. In a fluid operated servomotor having a plurality of, or redundant, control valves for porting fluid to a servo power section, each control valve having an engage valve operable to one position to render its control valve effective on said power section; a plurality of operating means for said control valves; means applying an oscillating signal to all of said operating means for oscillating said valves; a plurality of sensor means responsive to oscillations of said plurality of control valves operating said engage valves; and comparing means controlled by all engage valves for enabling but one of said engage valves to be moved to said one position.

6. In a fluid pressure operated servomotor having a plurality of variably displaceable servo operation control valves for porting fluid to a servo power section of the servomotor, in combination: an engage valve for each control valve having two positions, in one of which an open fluid conducting conduit is provided through the control valve to the power section and in the other position no such conduit is provided; operating means for said control valves; means applying a high frequency oscillating electrical signal to all said operating means for said control valves; a plurality of sensor means responsive to cyclic fluid pressure caused by operation of the control valves from the high frequency signal, each sensor means tending to move its respective engage valve to said one position; and means responsive to all engage valves for biasing all of the engage valves but one to the other position.

7. The apparatus of claim 6, wherein each engage valve is provided with latching means to prevent short term cycling between channels for the separate servo control valves.

8. The apparatus of claim 6, wherein each engage valve is of the plug type; and a mechanical detent for each engage valve to prevent short term cycling between channels of the respective control valves.

9. The apparatus of claim 8, wherein the biasing means comprises a roller having its periphery abutted by each engage valve upon movement thereof by its respective sensor means.

10. In a fluid operated type servomotor having a plurality of variably positionable control valves for porting fluid to a power section of the servomotor, each control valve having an engage valve operable to one position to render a control valve effective on said power section, and a plurality of operating means for said control valves, in combination: a plurality of sensor means responsive to operation of said plurality of control valves; comparator means controlled by said plurality of sensor means and operating but one of said engage valves to said one position.

11. The apparatus of claim 10 wherein the sensor means includes a control valve operated mechanical-electrical transducer pickoff having its output to said comparator; and time delay means for applying a second signal to said comparator.

12. The appaartus of claim 10 wherein means are provided for applying an oscillating signal to all of said operating means.

13. In a fluid operated servomotor having a plurality of control valves for porting fluid to a power section of said servomotor, each control valve having first means operable in one position to render a control valve effective on said power section, and a plurality of operating means for said control valves, in combination: means applying an oscillating signal to all of said operating means for said control valve; a plurality of sensor means responsive to said plurality of control valves respectively; and comparing means controlled by said plurality of sensor means and permitting but one of said first means to be moved to said one position.

14. The apparatus of claim 13 wherein said comparing means receives one input through a time delay device from an oscillating signal source and a second input from operation of a control valve.

15. The apparatus of claim 14, wherein the comparing means receives for comparing purposes electrical signals from the control valve and the time delay device.

16. Control apparatus comprising:
a power section for positioning condition control devices;
a plurality of redundant channels receiving a command signal;
means for applying to each channel a tracer signal of a different frequency than that of the command signal;
first means in each channel responsive both to the command signal and the tracer signal;
second means in each channel connected to the first means in that channel and operated thereby in accordance with its response to the tracer signal; and
comparator means responsive to the operation of the second means of each channel for selecting one of the first means of the plurality of channels to control the power section.

17. Control apparatus comprising:
a fluid operated power section for positioning condition control devices;
a plurality of redundant channels receiving a command signal, each channel having a fluid transmitting servo control valve responsive to said command signal;
an engage valve in each channel, in operated position passing fluid from the control valve to the power section;
means operated by the control valve operating the engage valve; and
monitor means responsive to operation of all of the engage valves selecting that one of the plurality of control valves having the better response to the command signal.

18. In control apparatus:
a plurality of redundant channels receiving a command signal;
means for applying to each channel a tracer signal of a different frequency than that of the command signal;
valve means in each channel responsive both to the command signal and the tracer signal;
further means in each channel connected to the valve means in that channel and responsive to fluid passing therethrough and operated in accordance with the response of the valve means to the tracer signal; and
comparator means responsive to the operation of the further means of each channel for selecting the one of the valve means having the greater response to the tracer signal.

References Cited
UNITED STATES PATENTS

| | | | |
|---|---|---|---|
| 2,976,846 | 3/1961 | Place | 91—363 |
| 3,081,968 | 3/1963 | Pesola | 91—363 |
| 3,190,185 | 6/1965 | Rasmussen | 91—363 |
| 3,266,378 | 8/1966 | Shaw | 91—363 |
| 3,279,323 | 10/1966 | Asche | 91—363 |
| 3,314,334 | 4/1967 | Palmer | 91—384 |

PAUL E. MASLOUSKY, *Primary Examiner.*

U.S. Cl. X.R.

91—368, 447, 459, 461; 244—77, 78